No. 831,123. PATENTED SEPT. 18, 1906.
G. J. WAGNER & P. H. NELSON.
DROSS PAN AND FURNACE.
APPLICATION FILED SEPT. 27, 1905.
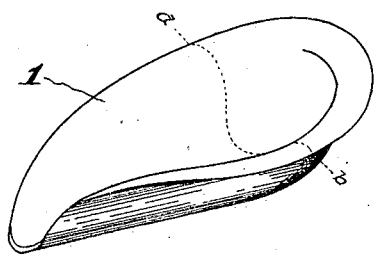
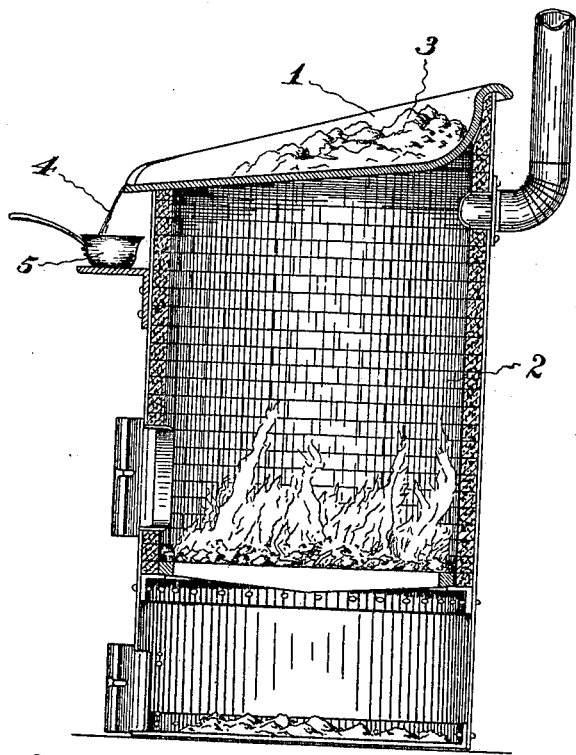
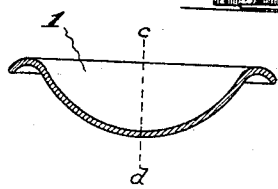
Witnesses.  Inventors.

UNITED STATES PATENT OFFICE.

GEORGE JOHN WAGNER AND PETER HENRY NELSON, OF PUEBLO, COLORADO.

DROSS PAN AND FURNACE.

No. 831,123.

Specification of Letters Patent.

Patented Sept. 18, 1906.

Application filed September 27, 1905. Serial No. 280,283.

*To all whom it may concern:*

Be it known that we, GEORGE JOHN WAGNER and PETER HENRY NELSON, citizens of the United States, residing at Pueblo, in the county of Pueblo and State of Colorado, have invented a new and useful Dross Pan and Furnace, of which the following is a specification.

Our invention relates to improvements in dross pans and furnaces in which the heat is procured by any well-known method and in which the furnace is oval in horizontal cross-section and in which the dross-pan is oval in horizontal cross-section and applied to the furnace in such a manner as to cause the spout of the pan to be the lowest point thereof, thus permitting the melted metal to flow out without being heated to a higher degree of heat than is necessary to melt it.

The object of our improvement is to provide a furnace and pan for heating dross to such a degree of heat that any metal remaining therein will melt and immediately flow out of the pan. We attain these objects by the mechanisms illustrated in the accompanying drawings, in which—

Figure 1 is a cross-section elevation through the major axis $c\,d$, Fig. 3, of the pan and furnace. Fig. 2 is a perspective view of the pan, and Fig. 3 is a cross-section through the minor axis $a\,b$, Fig. 2, of the pan.

Similar numbers refer to similar parts throughout the several views.

The furnace is not unlike furnaces now in use, except it is oval in horizontal cross-section and so formed at its top to neatly fit the form of the pan 1, the top of the furnace 2 being higher at the back than at the front, so as to cause the pan when placed in it to slope to the front or spout end, as shown in Fig. 1.

The pan 1 being curved at every point of its surface except the bottom, as shown in Figs. 1, 2, and 3, the metal 4, melted from the dross 3, will flow out of the pan into a suitable vessel 5 as soon as it is sufficiently heated to flow. The pan 1 being oval in horizontal cross-section and the spout being at the smaller end holds the dross from flowing out with the melted metal.

We are aware that prior to our invention furnaces have been made with metal pans with heat applied to them in the same way as we show, and we therefore do not claim such a combination broadly; but What we do claim, and desire to secure by Letters Patent, is—

1. The combination in a sheet-metal, brick-lined furnace, having a grate, draft-pipe and suitable doors for feeding fuel to and removing ashes therefrom, and having its top so formed as to fit the form of a dross-pan the horizontal cross-section of which is oval in form in such manner as to cause the spout of the dross-pan to be lower than any other point of its surface, of a dross-pan substantially as shown.

2. The combination in a furnace having its top so formed as to fit a dross-pan so as to cause the spout thereof to be its lowest point, of a dross-pan curved at every point of its surface except its bottom line, substantially as set forth.

In testimony whereof we have signed our names to this specification in the presence of two subscribing witnesses.

GEORGE JOHN WAGNER.
  PETER HENRY NELSON.

Witnesses:
 L. I. WILSON,
 J. W. FINLAN.